United States Patent
Hull et al.

(10) Patent No.: US 8,036,940 B2
(45) Date of Patent: Oct. 11, 2011

(54) SYSTEM AND METHOD FOR DISPLAYING INVENTORY AND FUTURE INVENTORY FOR PURCHASE

(75) Inventors: Steven A. Hull, Snoqualmie, WA (US); Robert Scoverski, Seattle, WA (US); Steven John Malloy, Redmond, WA (US); Scott Joseph Bean, Seattle, WA (US)

(73) Assignee: Silvaris Corporation, Bellevue, WA (US)

( * ) Notice: Subject to any disclaimer, the term of this patent is extended or adjusted under 35 U.S.C. 154(b) by 0 days.

(21) Appl. No.: 11/624,145

(22) Filed: Jan. 17, 2007

(65) Prior Publication Data
US 2007/0168261 A1 Jul. 19, 2007

Related U.S. Application Data

(60) Provisional application No. 60/760,005, filed on Jan. 17, 2006.

(51) Int. Cl.
*G06Q 20/00* (2006.01)
*G06Q 10/00* (2006.01)

(52) U.S. Cl. .......................................... 705/22; 705/28

(58) Field of Classification Search .................... 705/22
See application file for complete search history.

(56) References Cited

U.S. PATENT DOCUMENTS

| 5,712,989 A * | 1/1998 | Johnson et al. ................ 705/28 |
| 2002/0099631 A1 * | 7/2002 | Vanker et al. .................. 705/28 |
| 2002/0178093 A1 * | 11/2002 | Dean et al. ..................... 705/28 |
| 2003/0036984 A1 * | 2/2003 | Chiu et al. ...................... 705/28 |
| 2003/0200150 A1 * | 10/2003 | Westcott et al. ............... 705/26 |
| 2003/0204450 A1 * | 10/2003 | Heinrichs et al. ............. 705/28 |
| 2004/0049433 A1 * | 3/2004 | Yokoyama et al. ............ 705/26 |

* cited by examiner

*Primary Examiner* — Faris Almatrahi
(74) *Attorney, Agent, or Firm* — Richard T. Black; P. G. Scott Born; Foster Pepper PLLC

(57) ABSTRACT

An embodiment of the invention provides the ability for forest products sellers to provide potential buyers with price and availability information about their products, whether or not those products are in existing inventory. It gives the seller control over which products can be pre-sold prior to production or purchase, and control over pre-sold quantities so that the seller may be not committed beyond his capacity to produce or purchase to fill orders and inquiries. An embodiment of the invention provides sellers a means for indicating willingness to sell specific forest products under specific conditions of price, time, delivery, and other terms.

6 Claims, 8 Drawing Sheets

SYSTEM AND METHOD FOR DISPLAYING INVENTORY AND FUTURE INVENTORY FOR PURCHASE

PRIORITY CLAIM

This application claims priority to U.S. provisional patent application Ser. No. 60/760,005 filed Jan. 17, 2006 and to U.S. patent application Ser. No. 11/329,414 filed Jan. 9, 2006 that in turn, claims priority to U.S. provisional patent application Ser. No. 60/690,407 filed Jun. 13, 2005 and to U.S. provisional patent application Ser. No. 60/644,327 filed Jan. 7, 2005. All of the above applications are hereby incorporated by reference in their entirety as if fully set forth herein.

COPYRIGHT NOTICE

A portion of the disclosure of this patent document contains material which is subject to copyright protection. © Silvaris Corporation. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

An embodiment of the invention relates generally to network and Internet based computer software and systems to facilitate more efficient and convenient purchase and sale of items of inventory.

BACKGROUND OF THE INVENTION

The forest products marketplace is large and complicated, with thousands of producers, wholesalers, distributors, and end users. This marketplace has a vast array of specific products and product features, constant flux in pricing and availability of both the product and transportation, and poor transparency into real pricing and availability of even the most commoditized products. Quality market information is difficult to obtain for those actively shopping and/or selling products in the marketplace. Unlike the securities markets, for example, where price, volume and market analytics are readily available to a wide audience, forest products are bought and sold with unclear notions of their real current worth in the broader marketplace. There is a need for efficient systems that allow sellers to provide better price and availability information to buyers, and to allow sellers to assess the response from buyers.

BRIEF DESCRIPTION OF THE DRAWINGS

Embodiments of the present invention are described in detail below with reference to the following drawings.

FIG. 2 depicts a screen shot of one embodiment of the invention showing how a seller sees quantities of existing inventory and future inventory that are displayed to potential buyers using Silvaris SupplierConnect.

FIG. 4 depicts a screen shot of one embodiment of the invention showing how a Silvaris buyer, using technology available to Silvaris employees, can select existing inventory and future inventory for an order.

FIG. 5 depicts a screen shot of an alternate embodiment of the invention as shown in FIG. 4, showing how a customer using Silvaris CustomerConnect can select existing inventory and future inventory for an order.

DETAILED DESCRIPTION OF THE PREFERRED EMBODIMENTS

Figure 1:
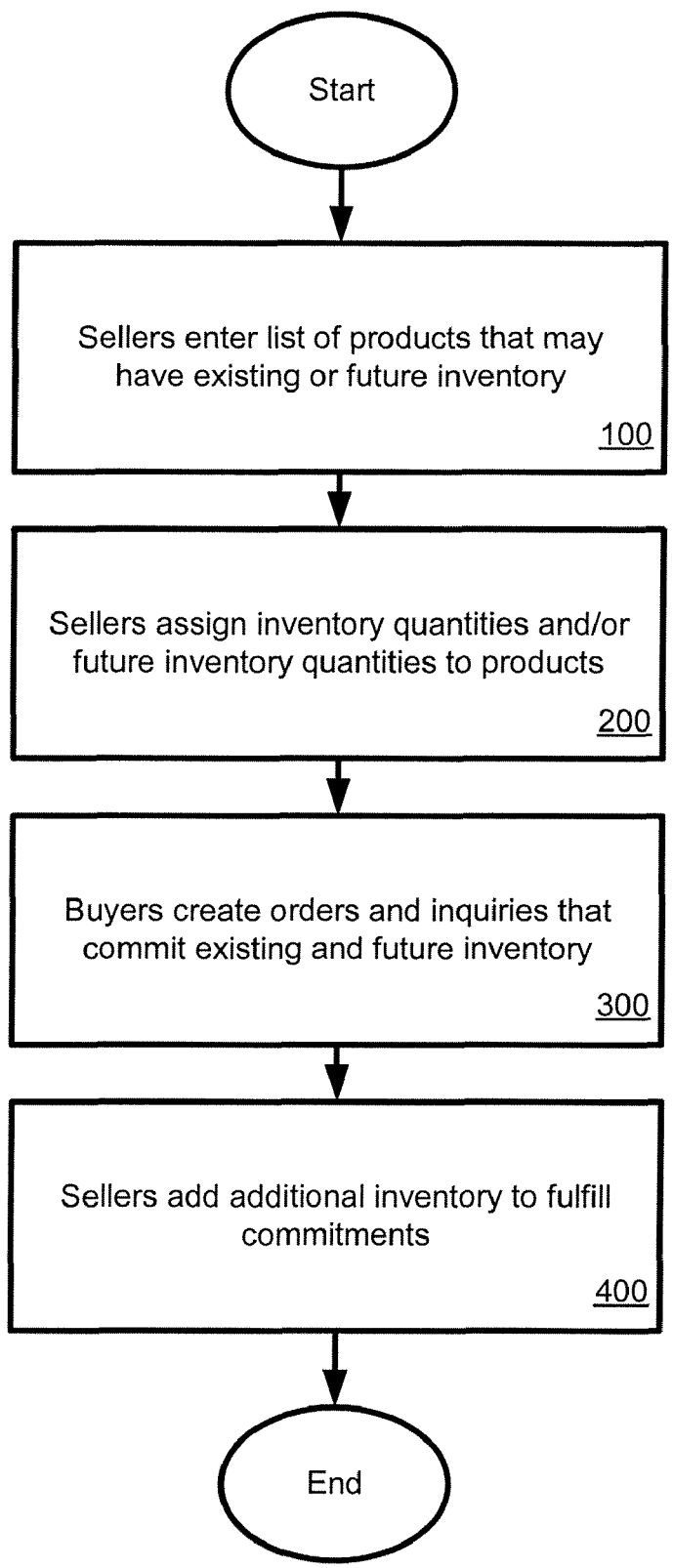
FIG. 1 illustrates an overview of a process that allows sellers to provide data to buyers about existing inventory and future inventory, allows buyers to inquire or buy the product, and sellers to fill the future inventory with real inventory as it is produced or purchased.

An embodiment of the invention includes network-based software interfaces, business rules, data structures, data, and interactions between these interfaces, rules, structures, and data.

An embodiment of the invention provides a means for forest products sellers to provide potential buyers with price and availability information about their products, whether or not those products are in existing inventory. It gives the seller control over which products can be pre-sold prior to production or purchase, and control over pre-sold quantities so that the seller may be not committed beyond his capacity to produce or purchase to fill orders and inquiries. An embodiment of the invention provides sellers a means for indicating willingness to sell specific forest products under specific conditions of price, time, delivery, and other terms.

An embodiment of the invention enables buyers to order or inquire about products in current inventory and future inventory. It presents buyers with an opportunity to lock in a current price without the product having to be currently available. Buyers' actions provide sellers with data about real product demand against both current supply, and against supply they could fill through production (manufacturers) or purchasing (resellers). As such, an embodiment of the invention provides sellers with customer-driven direction for their production and purchasing behavior; it provides real demand against existing inventory as well as inventory sellers could have in the future.

In this document and accompanying figures, "future inventory" may also be referred to as over-committed inventory, and associated features of an embodiment of the invention may refer to over-commit products or quantities.

In this document and accompanying figures, "sellers" may include manufacturers, distributors, wholesalers, and/or resellers. Sellers are participants in negotiation processes with buyers that may include but is not limited to determining the nature of the products that will be sold, the pricing rules and amounts for the products, and/or the timing and details of shipment of the products. Sellers may provide data related to the nature and descriptions of the products and the available current and future quantities of the products. "Buyers" are purchasers and/or consumers of products. Buyers are participants in negotiation processes with sellers that may include but is not limited to determining the nature of the products that will be sold, the pricing rules and amounts for the products, and/or the timing and details of shipment of the products. Buyers may provide data related to the specific types of products they wish to purchase, and the quantities of products as well as desired time to receive products.

In this document and accompanying figures, an order may be a final commitment to buy, and an inquiry may be a tentative commitment that has the same effect on inventory as an order, but may be a non-binding agreement between the seller and buyer at the time it is placed. However, in some embodiments of the invention, an inquiry may commit inventory temporarily until an order is finalized; like an order, this decrements the quantities available for following purchases and inquires.

An embodiment of this invention is currently a feature of Silvaris SupplierConnect technology, which is used between lumber and panel mills (sellers) and Silvaris (buyer). It is also a concept behind Silvaris SupplierDirect, MillDirect and CustomerConnect technologies, which in one embodiment may directly connect sellers and buyers with or without a third party intermediary taking title for the product; sellers provide information about the price and availability of current inventory at a mill, and/or potentially available product, and buyers in turn may indicate their willingness to buy specific products offered.

FIG. 1 illustrates a process, according to an embodiment of the invention, whereby a seller provides the system with information about existing inventory and future inventory, buyers see the inventory and select it for purchase or further inquiry, and sellers replenish future inventory with existing inventory when available. The process is illustrated as a set of operations shown as discrete blocks. The process may be completely or partially implemented in any suitable hardware, software, firmware, combination thereof, and/or computer-readable media. The number and order in which the operations are described is not to be necessarily construed as a limitation.

At block 100, sellers add information to the system about the products they either have on hand or intend to stock. For forest products, this information may include but is not limited to the dimensions, grade, species, finishing, moisture, and other physical attributes that accurately describe and distinguish the product. The information may also include current selling price for the product and the number of pieces per unit, a standard lot size in the forest products industry, also often known as a bundle or pack.

At block 200, sellers add units to inventory when it is finished and available for sale. They also have an option to over-commit their inventory beyond existing and available stock on hand. Over-committing allows sellers to show buyers the product inventory they stock and intend to stock in the future. The over-commitment may or may not be coupled to actual production or purchase commitments the sellers have already made.

At block 300, buyers make inquiries and orders against product that exists in sellers' inventories as well as future inventor that sellers intend to stock at any date in the future.

At block 400, if seller is a manufacturer, his inventory may be replenished by finished production; if seller is a reseller, his inventory may be filled by purchasing new inventory.

Figure 2:
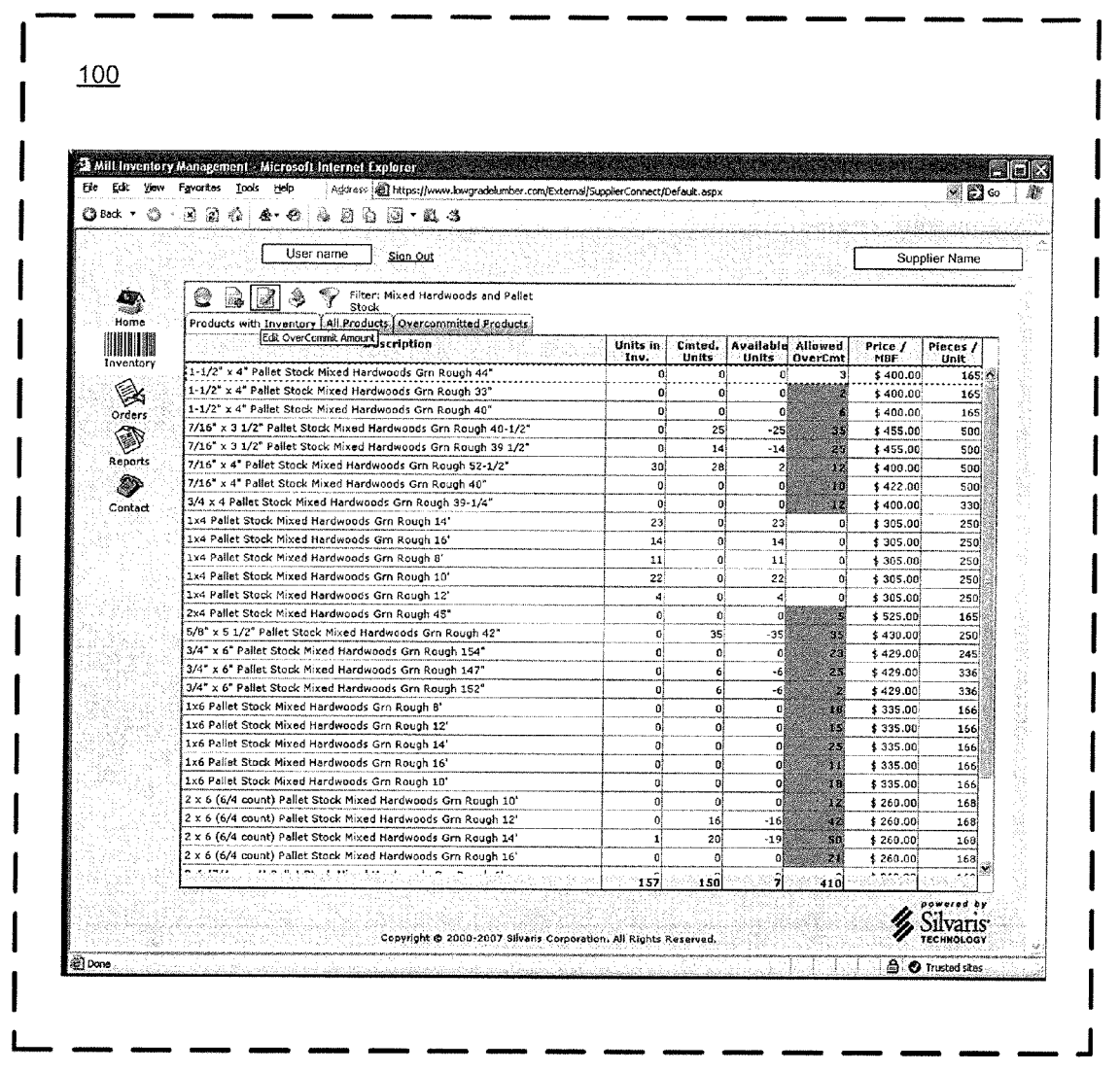

FIG. 2 is a screen shot from Silvaris SupplierConnect depicting one embodiment of how sellers can enter and view a list of inventory, as described in FIG. 1, block 100, and to select products and change their over-commit settings.

Three different inventory views may be available: a view of all products that have inventory or over-committed quantities and can be committed by buyers to orders and inquiries; a view of all products, including those with no inventory or over-commit quantities, and a view of products with over-commit quantities. The view shows a description of the product including attribute details, the quantity in inventory, the quantity committed to orders and inquiries, the units remaining available, the quantity of each product that can be over-committed, the price of the product, and the pieces of product per unit.

Icons above the tabs allow a seller to see orders where certain product amounts are committed; to add, modify, or delete products from the list; to export the list to a spreadsheet; and to filter the items from the list that are visible on screen. When a seller clicks on the Edit Over-Commit Amount icon, a dialog box appears as shown in FIG. 3.

Figure 3:
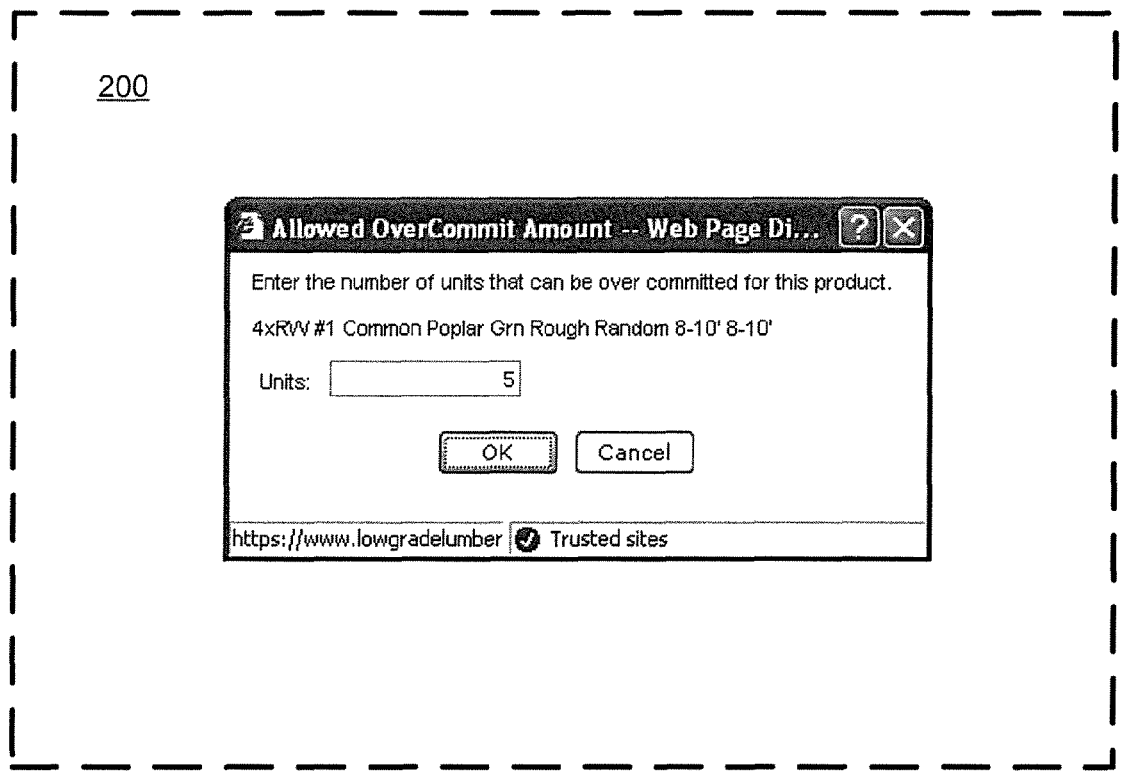
FIG. 3 depicts a screen shot of one embodiment of the invention showing how a seller indicates quantities of future inventory to display to potential buyers using Silvaris SupplierConnect.

FIG. 3 is a dialog box that provides the seller with control over the quantity of future inventory that can be committed by buyers to orders and inquiries, as described in FIG. 1, block 200. In this example, the seller is allowing five units of the product to be pre-sold prior to having the stock available in on-hand inventory.

Figure 4:
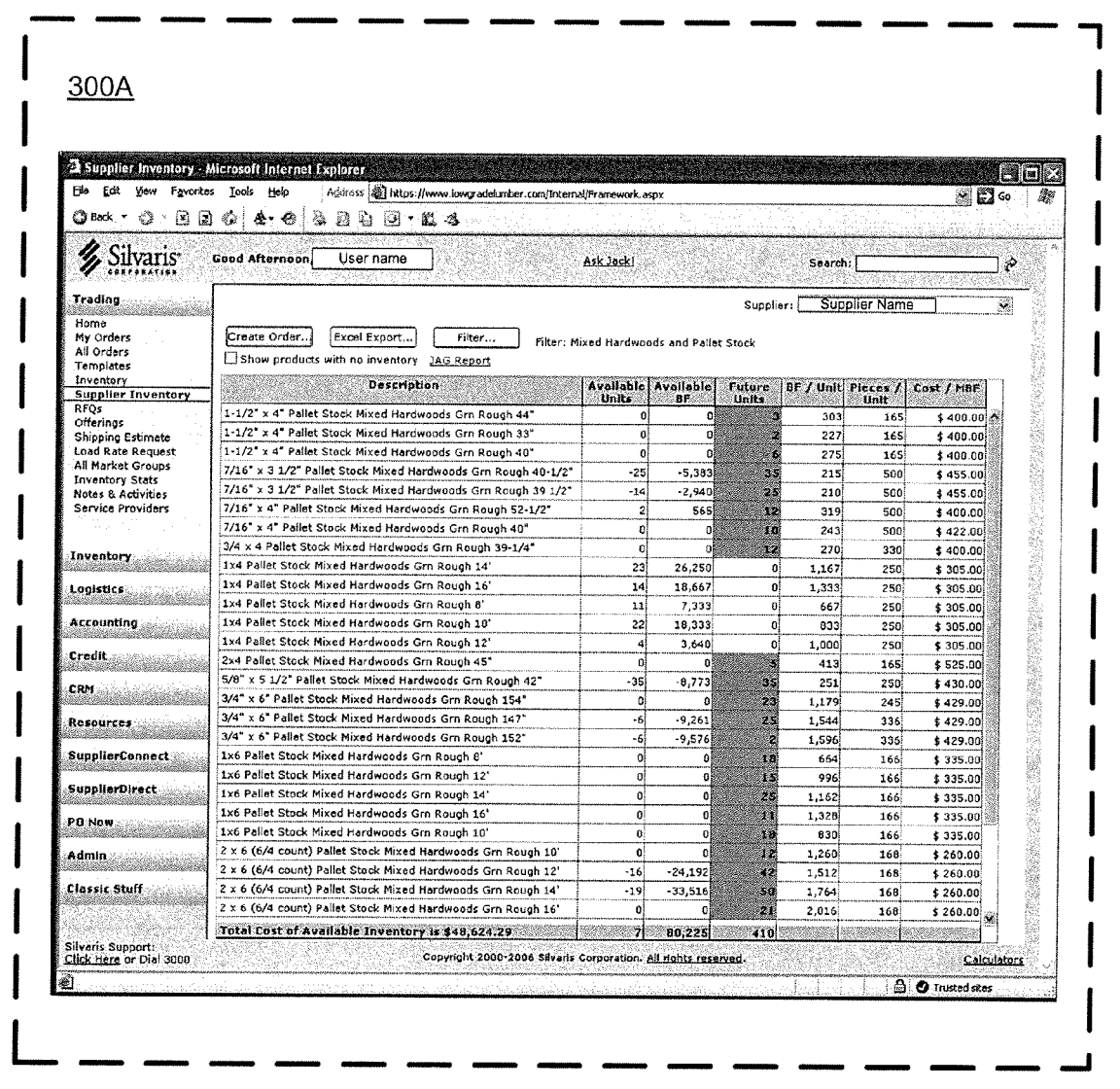

FIG. 4 is one embodiment of the way a buyer can create an order using existing inventory, future inventory, or both, as described in FIG. 1, block 300. This screen, although similar to the screen shown to sellers in FIG. 2, depicts a view available to Silvaris buyers who can select products from the list, and make commitments to buy the product by placing them on an order. An order may be created by clicking the Create Order button.

In this particular example, both sellers and buyers have an identical view of the absolute quantities in existing on-hand inventory and the quantity of product that is being pre-sold. In other embodiments described below, the buyer may have no awareness of whether the product being sold currently exists in inventory or not.

When a buyer specifies quantity on an order, the maximum the buyer may be allowed to specify is an amount Z. In one embodiment of the invention, the value for Z is determined as the quantity of existing on-hand inventory (A) plus the over-commit quantity allowed by the seller for the product (B), less the quantity that is currently committed on other, preceding orders and inquiries (C). The value for Z, the maximum quantity a buyer can add to an order or inquiry, is equal to (A+B)−C. When the committed quantity on all orders and inquiries is equal to Z, buyers cannot add further to orders or inquiries. In some embodiments of the invention, the product may not even appear in any buyer view. Buyers can be allowed to claim further product if the seller replenishes on-hand inventory, extends the over-commit quantity, declines inquiries, or cancels orders.

An embodiment of the invention provides both parties with a means for indicating willingness to sell and buy specific forest products under specific conditions of price, time, delivery, and other terms. It also provides a means for locking in those terms as a final sale of the product, whether determined on the day the order finalized, the day the order is filled, or by some other condition.

In one embodiment, the invention allows order and inquiry types that include but are not limited to pre-arranged contracts that specify definite prices and shipment times, sales that have an agreed-upon price and indefinite shipping time, and sales that have an agreed-upon time of fulfillment at a price to be determined later. When price is indefinite, the price could be locked in, for example, at the time the order or inquiry is created, at the time the product is available in actual inventory, at the time of shipment, or at the time of delivery.

Figure 5:
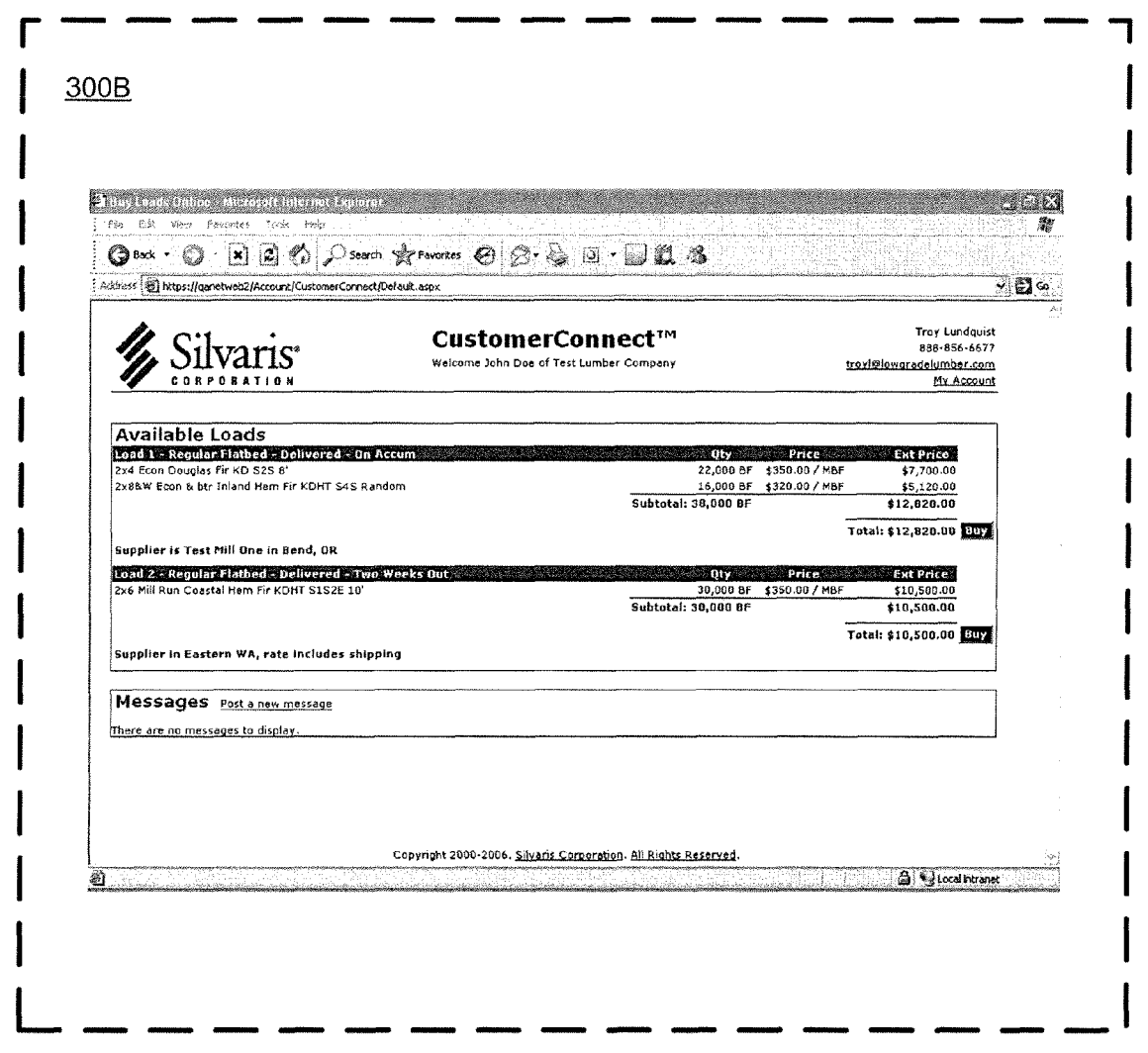

FIG. 5 is an alternate embodiment of the way a buyer could create an order using a seller's existing inventory, future inventory, or both, as described in FIG. 1, block 300. In this screen shot, a seller has used Silvaris CustomerConnect to make two loads available for purchase by buyers. The buyer clicks the Buy button to commit to ordering the product(s) shown. As in the embodiment shown in FIG. 4, the product may not appear to the buyer if the value for Z, the maximum quantity a buyer can add to an order or inquiry, has been met or exceeded by preceding orders and inquiries.

Figure 6:
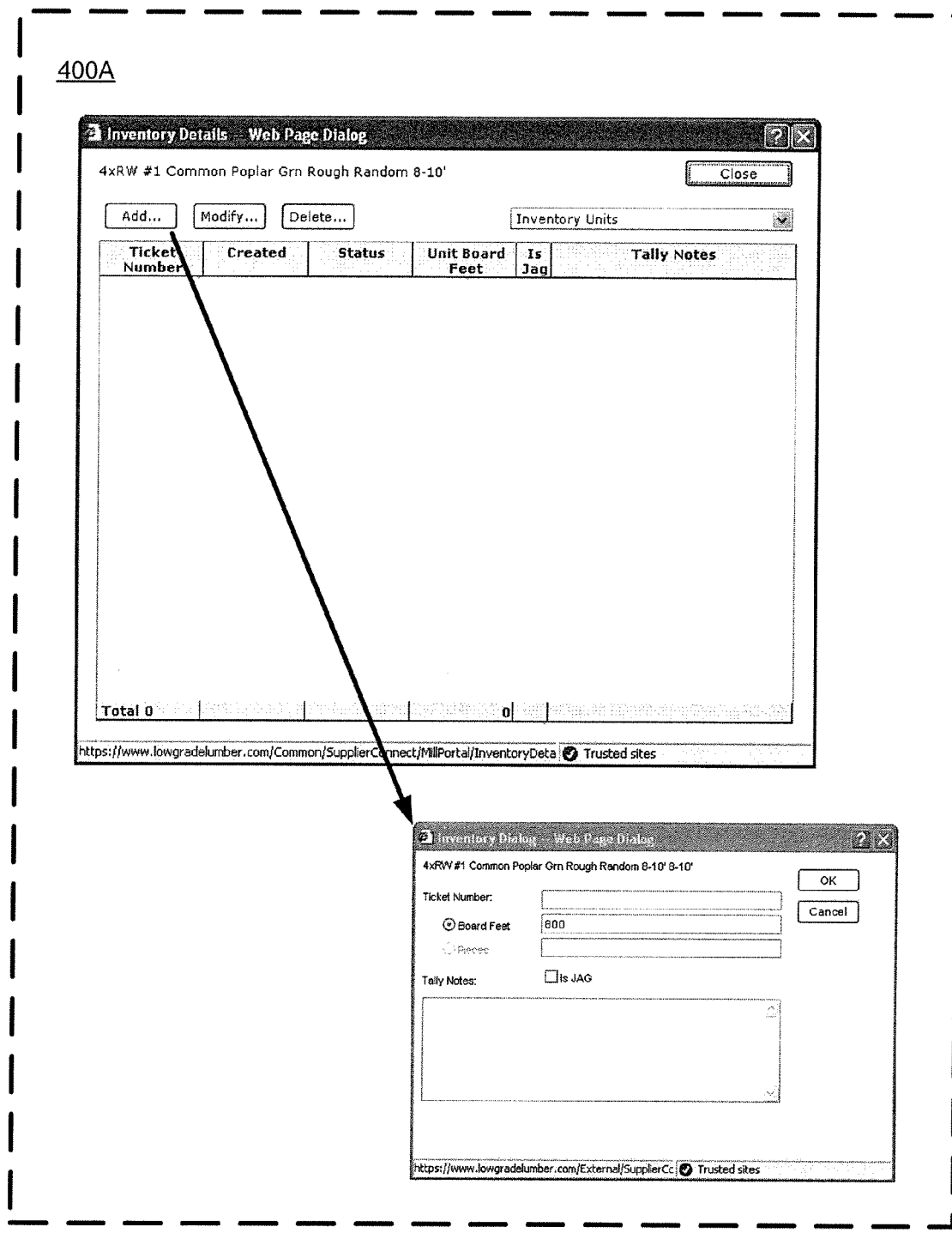
FIG. 6 depicts screen shots of one embodiment of the invention showing how a seller may enter inventory using Silvaris SupplierConnect.

FIG. 6 depicts one embodiment of the way a buyer can fill existing inventory as described in FIG. 1, block 400. If the seller is a manufacturer, his inventory may be replenished by finished production; if seller is a reseller, his inventory may be have been filled by purchasing new inventory. Depicted in FIG. 6 is a screen shot of the seller's view of Silvaris SupplierConnect dialog boxes that appear when the seller clicks the Add/Edit/Delete items icon shown in FIG. 2. Clicking the Add button in the first dialog box opens the second dialog box shown below it in the figure. In the second box, the seller can add inventory ticket numbers for product, board footage, and other information related to the inventory being added to the system.

Figure 7:
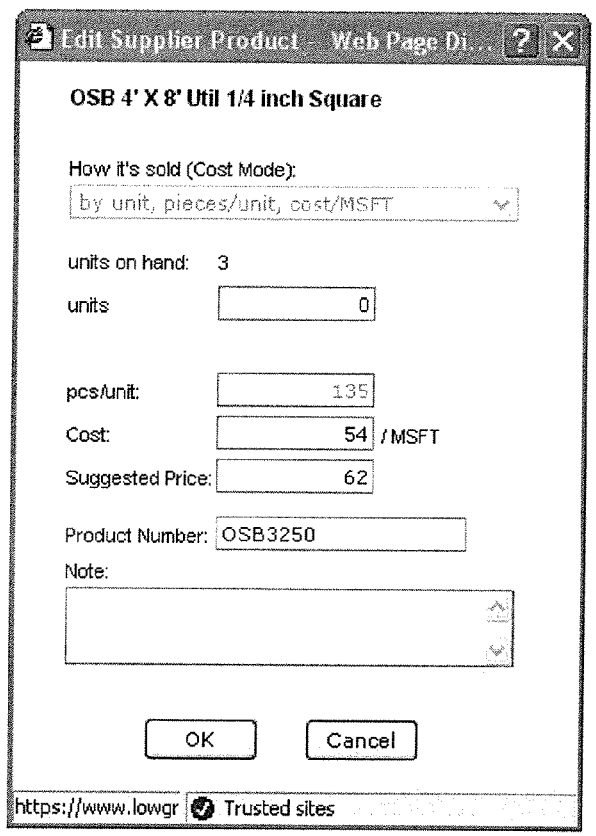
FIG. 7 depicts a screen shot of an alternate embodiment of the invention as shown in FIG. 6, showing how a seller enters new inventory using Silvaris SupplierDirect.
Figure 8:
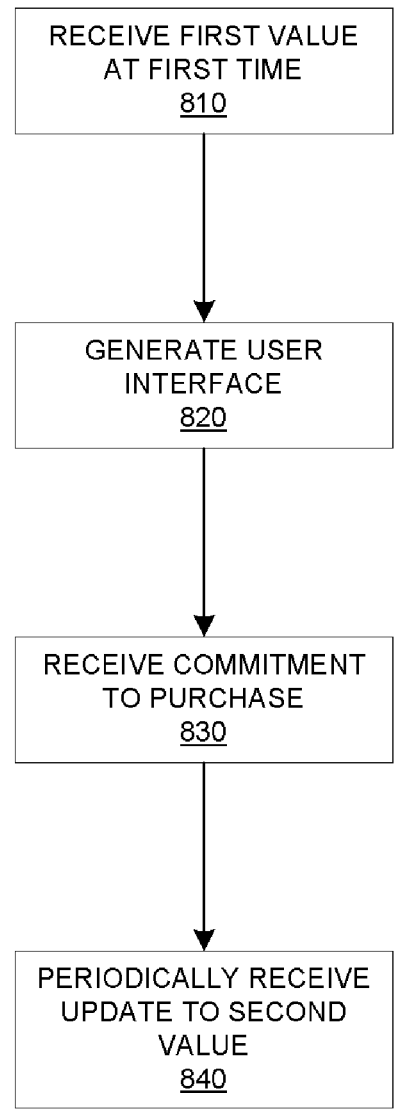
FIG. 8 illustrates a process according to an embodiment of the invention.

FIG. 7 is an alternate embodiment of a supplier filling inventory, as described in FIG. 1, block 400. Depicted in FIG. 6 is a screen shot of the seller's view of a Silvaris SupplierDirect dialog box. Using SupplierDirect, the seller enters in available inventory quantity information by specifying a number of units to add to the number of units on hand. The amount entered may include future inventory. The seller may change cost, suggested price, product number, and other notes.

Embodiments of the invention in which an exclusive property or privilege is claimed are defined as follows:

1. A method implementable in at least one server coupled to a network, the method comprising:
   receiving, at a first time from a product seller via a first client device coupled to the network, a first value indicative of a first quantity of the product, the first quantity having not been acquired by the seller at the first time, the first quantity to be acquired by the seller at a second time later than the first time, the first quantity comprising an over-commitment for sale by the seller of the product beyond existing and available stock on hand;
   generating a user interface at a third time to a second client device coupled to the network and associated with a product buyer, the user interface displaying a second value indicative of a second quantity of the product, at least one portion of the second quantity being selectable to be made subject to a purchase commitment by the buyer, the third time being earlier than the second time and later than the first time, the second quantity comprising the first quantity and a third quantity of the product acquired by the seller as of the third time; and
   receiving at the third time from the buyer a commitment to purchase the at least one portion.

2. The method of claim 1 wherein the product comprises forest products.

3. The method of claim 1, further comprising periodically receiving from the first client device an update to the second value.

4. The method of claim 1 wherein purchase commitment is at a first price.

5. The method of claim 1 wherein the purchase commitment has an associated time of delivery of the at least one portion subsequent to the second time.

6. A physical computer-readable medium including instructions that, when executed by at least one processing device coupled to a network, enable the at least one processing device to perform a method comprising:
   receiving, at a first time from a product seller via a first client device coupled to the network, a first value indicative of a first quantity of the product, the first quantity having not been acquired by the seller at the first time, the first quantity to be acquired by the seller at a second time later than the first time, the first quantity comprising an over-commitment for sale by the seller of the product beyond existing and available stock on hand;
   generating a user interface at a third time to a second client device coupled to the network and associated with a product buyer, the user interface displaying a second value indicative of a second quantity of the product, at least one portion of the second quantity being selectable to be made subject to a purchase commitment by the buyer, the third time being earlier than the second time and later than the first time, the second quantity comprising the first quantity and a third quantity of the product acquired by the seller as of the third time; and
   receiving at the third time from the buyer a commitment to purchase the at least one portion.

* * * * *